Feb. 21, 1956　　　M. F. ECKER ET AL　　　2,735,701
SEAL CONSTRUCTION

Filed July 24, 1952　　　　　　　　　　　　　2 Sheets-Sheet 1

INVENTORS:
MURRY F. ECKER
DORAN B. HARNEY
BY THEIR ATTORNEYS
HARRIS, KIECH, FOSTER & HARRIS

United States Patent Office 2,735,701
Patented Feb. 21, 1956

2,735,701
SEAL CONSTRUCTION

Murry F. Ecker, Downey, and Doran B. Harney, Compton, Calif., assignors to Pacific Pumps, Inc., Huntington Park, Calif., a corporation of California Application July 24, 1952, Serial No. 300,632

8 Claims. (Cl. 286—11.14)

This invention relates to high-pressure seals for rotating shafts and more particularly refers to a high-pressure seal adapted for automatic adjustment to compensate for axial shift on the part of the shaft.

The type of seal to which the invention pertains is a well-known combination of three annular bodies, namely: a fixed sleeve surrounding the shaft; a first non-rotating annular sealing member, commonly termed a follower, that is slidingly telescoped on the sleeve and provides one of the two required sealing faces surrounding the shaft; and, finally, a second annular sealing member that is carried by the shaft for rotation therewith and provides a second sealing face to match the sealing face of the first annular sealing member. This assembly is so designed that the pressure of the surrounding fluid acting in a differential manner on the follower tends to urge the follower towards the second annular sealing member to maintain the desired sealing relation between the two sealing faces. Usually a suitable spring is provided to exert additional pressure against the follower in the same axial direction.

This assembly of sleeve, follower and rotary sealing member is enclosed in what may be termed a sealing chamber which is in communication with the high-pressure zone into which the shaft extends, such communication being along the clearance space around the shaft. To close all paths of possible fluid escape, the sleeve is united with the wall of the sealing chamber in a fluid-tight manner and a suitable annular seal such as an O-ring is provided between the sleeve and the follower. The O-ring is usually mounted in an inner circumferential recess or groove of the follower to embrace the sleeve and to be carried along the sleeve by movement of the follower. It is essential that the O-ring slide along the sleeve with sufficient ease to permit the follower to maintain sealing contact with the second annular sealing member that rotates with the shaft. To facilitate sliding movement of the O-ring, it is desirable and common practice to provide the sleeve with a highly polished surface and the sleeve may be chrome-plated for this purpose.

The invention is based on the discovery of a defect in the operation of such a sealing assembly that develops when the assembly is subject to periodic pressure changes of relatively large magnitude. It has been discovered that failure of the most carefully designed seal in extremely high-pressure usage may be attributed to two combined causes.

The first of the two coacting causes is axial movement of the shaft in response to fluid pressure changes of high magnitude. Since one end of the shaft extends into the high-pressure zone, the high-pressure fluid tends to displace the shaft longitudinally outward from the zone against whatever means is employed to restrain outward axial movement of the shaft. Conventionally such axial restraining means comprises a suitable thrust bearing. Under exceedingly high pressures, on the order of 3000 p. s. i. or higher, the shaft yields minutely but significantly in compression and the structure including the thrust bearing that restrains the shaft against outward axial movement yields to even greater extent. These two yielding actions are additive in their effect on the second sealing member carried by the rotating shaft since this rotating member will shift as the shaft moves bodily axially outward in response to yield of the structure that supports the thrust bearing and, of course, the rotating member will be additionally shifted axially in response to compression of the shaft. In a typical installation having an operating fluid pressure between 2500 and 3000 p. s. i., the axial shift of the rotary sealing member carried by the shaft may be on the order of .012 inch, the shift being axially outward by this amount whenever the fluid pressure is applied and axially inward by the same amount whenever the fluid pressure is removed.

This shift of the second annular sealing member rotating with the shaft would not affect the effectiveness of the sealing assembly if the follower on the stationary sleeve would shift correspondingly and synchronously in both of the two directions to maintain the desired sealing relation between the two sealing faces. When the operating fluid pressure drops, however, the reverse shift of the follower depends upon the differential fluid pressure on the follower together with the pressure of the spring. The spring pressure plus any prevailing differential fluid pressure that urges the follower toward its starting position is much less than the tremendous force on the shaft that caused the outward shift.

It is to be borne in mind that on occasion there is no fluid pressure whatsoever for differential action on the follower in the return axial direction. Thus any fluid pressure apparatus, for example, a high-pressure boiler, must be shut down occasionally and in some cases may be shut down regularly every 24 hours. In the absence of any fluid pressure whatsoever only the relatively small force of the spring remains in effect to urge the follower toward the retracted sealing member on the shaft.

We have discovered that this lower return axial force fails to shift the follower toward the retreating annular sealing member on the shaft in the manner required to prevent leakage between the two sealing faces. The basic difficulty is that the O-ring carried by the follower adheres too tenaciously to the sleeve to permit the required relative axial movement between the follower and the sleeve. It is true that the tenaciously adhering O-ring is sufficiently resilient to yield in distortion to a certain degree in response to the return axial pressure on the follower and such distortion will permit, say, as much as .001 to .002 inch axial movement on the part of the sleeve, but such limited axial movement cannot match the above-mentioned .012 inch return shift of the annular sealing member carried by the shaft. Thus, the adhesion of the O-ring to the sleeve causes separation between the two sealing faces in a high-pressure installation with consequent fluid leakage between the sealing faces.

The reason that an elastomer O-ring tends to bond to even a highly polished chrome surface is not fully understood, but certain characteristics of its adhesive behavior have been ascertained experimentally. It has been found that the sliding response of the O-ring to an abrupt axial pressure decreases with the length of time the seal remains stationary prior to application of the axial pressure. For example, as has been ascertained experimentally, a newly mounted O-ring may be shifted on a polished surface by the application of a very small axial force, say a force on the order of 4 lbs., but after a period of 4 hours in which the O-ring is permitted to remain stationary, say 30 lbs. pressure would be required to slide the O-ring. After 24 hours the force required to budge the O-ring would amount to 200 lbs. or more. On the other hand, it is a surprising fact that a relatively low pressure will cause the O-ring to creep gradually over a long period of time. This gradual creeping response is fortunate since it permits axial movement of the follower against the sealing member on the shaft at a sufficient rate to compensate for wear at the two matching sealing faces. Over a period of time the gradual sliding response of the O-ring will result in closing any gap between the two sealing faces that may be caused by an abrupt drop in fluid pressures, but in the meantime foreign particles entering the gap usually abrade the sealing faces and, moreover, subsequently prevent effective closure of the gap.

The present invention contemplates solving this defect in the operation of the sealing assembly by making the sleeve carrying the follower responsive to fluid pressure in compensation, at least in part, for the fluid pressure responsiveness of the shaft. The general object of the invention is to carry out this concept.

Complete compensation is not always necessary because of the yield in distortion of the adhering O-ring and perhaps also because in some installations the gradual sliding response of the O-ring to sustained axial pressure will close an exceedingly small gap in a short enough time interval to prevent damage by entrance of foreign particles.

In deciding on the magnitude of compensating response of the sleeve that is to be provided in a particular installation, it should be borne in mind, as previously pointed out, that axial shift of the annular sealing member on the shaft is caused not only by yielding action of the means that restrains the shaft against bodily movement but also by yield in compression of the shaft itself. Usually the fluid pressure response of the sleeve should be sufficient to compensate at least for the yielding action of the shaft restraining means.

It will be apparent to those skilled in the art that in accord with our basic concept, various arrangements may be used to cause the desired fluid-responsive compensating shift of the sleeve carrying the follower. In the initial embodiment of the invention, however, the sleeve is anchored to a wall of the sealing chamber in which it is confined and such wall of the sealing chamber itself is constructed for yielding action in response to fluid pressure, the response being sufficient to shift the sleeve automatically to the extent required. Such a practice of the invention will be described herein for the purpose of disclosure and illustration as well as to provide adequate guidance for those skilled in the art who may have occasion to apply the same principles to other specific purposes.

It follows from the foregoing that a specific object of the invention is to provide a suitable fluid-pressure-responsive construction for a wall of the sealing chamber. In the preferred practice of the invention described herein the sealing chamber has the usual cylindrical peripheral wall but is closed at its outer end by a suitable resilient ring structure that has freedom for fluid pressure response. The ring structure is sufficiently resilient to act as a minutely yieldable diaphragm thereby to shift the sleeve minutely to compensate for the heretofore described minute yielding action that shifts the annular sealing member carried by the shaft.

A further object in one practice of the invention is to provide a desired compensating yielding action of relatively large magnitude by diaphragm action occurring in an annular zone of relatively small extent. As will be explained, this object is attained by stacking a plurality of diaphragm ring members in a manner that makes their yielding effects accumulative.

In the drawings, which are to be considered as merely illustrative:

Figure 1:
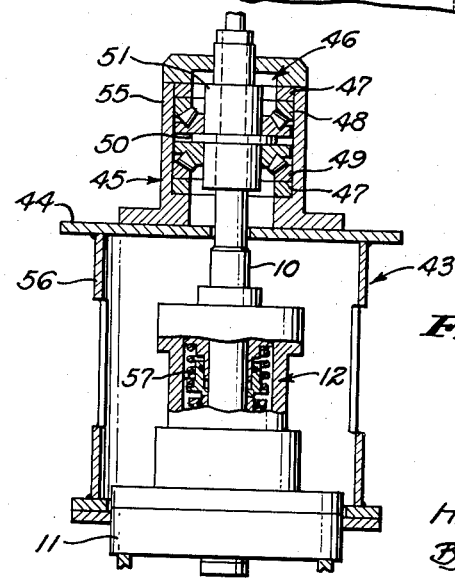
Fig. 1 is a simplified view partly in section and partly in side elevation of a typical apparatus incorporating the presently preferred practice of the invention.

Fig. 1 shows, by way of example, how the invention may be employed to provide an effective seal around a vertical shaft 10 that extends into a high-pressure zone. The high-pressure zone in this instance is the interior of a boiler circulating pump 11 which operates normally at a pressure in the range of 2500–3000 p. s. i., say 2700 p. s. i. It can be readily understood that since the shaft 10 terminates in an impeller inside the pump 11, for example, a centrifugal impeller, there will be an outward or upward axial force applied to the shaft by the high fluid pressure, the force being the product of the fluid pressure per unit area and the cross-sectional area of the shaft.

Figure 2:
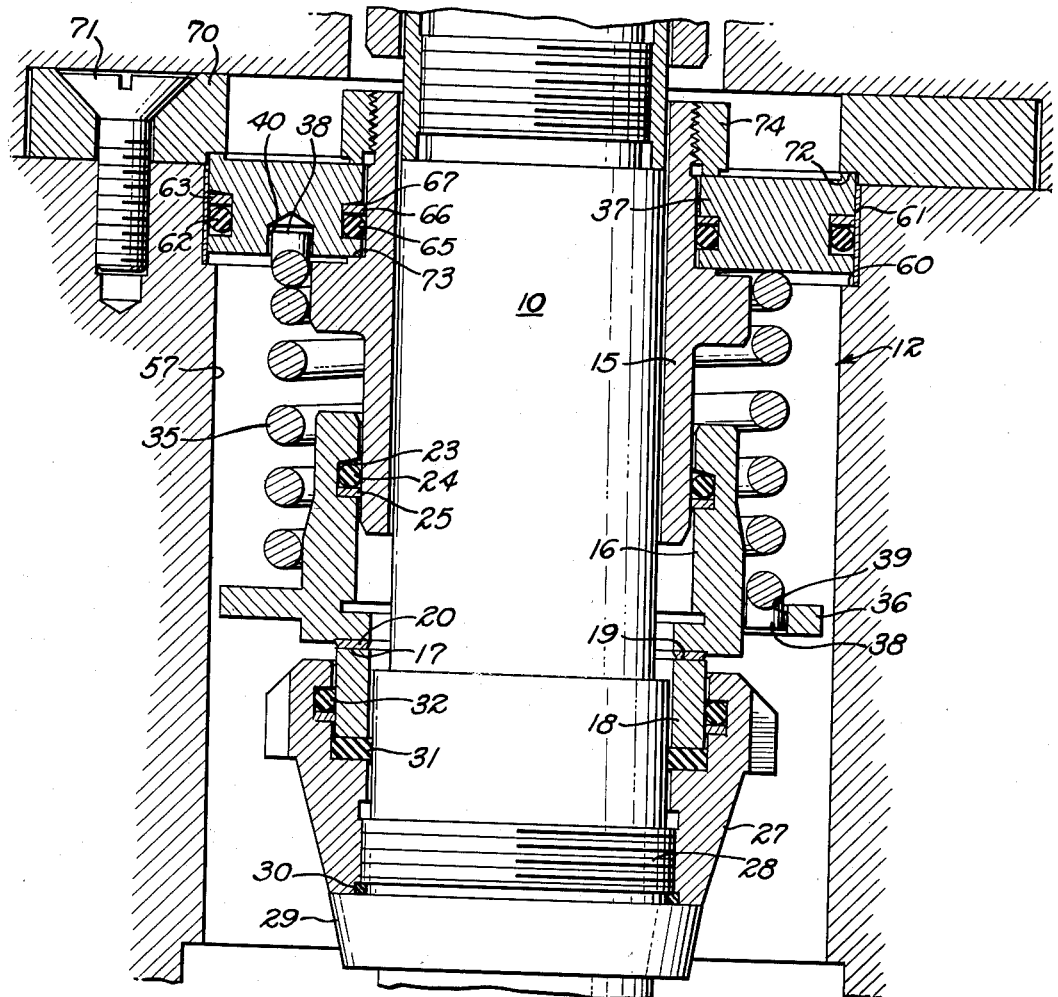
Fig. 2 is a longitudinal section on a larger scale of the sealing chamber and the sealing assembly enclosed therein.

The shaft 10 extends through a sealing chamber 12 which is in communication with the interior of the pump 11 by virtue of the clearance space around the shaft. The sealing chamber 12 encloses a typical sealing assembly which, as best shown in Fig. 2, comprises a non-rotating sleeve 15, a follower or first annular sealing member 16 having a sealing face 17, and a second annular sealing member 18 which is carried by the shaft 10 for rotation therewith and which has a sealing face 19 for cooperation with the first sealing face 17. The follower 16 is non-rotatably telescoped over the sleeve 15 for axial movement relative thereto and preferably is provided with a facing ring 20 unitary therewith, the surface of which constitutes the sealing face 17.

As heretofore stated, suitable sealing means is provided between the sleeve 15 and the surrounding follower 16 to prevent fluid leakage therebetween. In this instance, an inner circumferential groove 23 is provided in the follower 16 to confine a conventional O-ring 24 together with a conventional anti-extrusion ring 25. The O-ring 24 is typically made of a suitable elastomer, for example, synthetic rubber such as "Neoprene."

The second annular sealing member 18 that rotates with the shaft 10 is, in this instance, in the form of a ring of tungsten carbide and is held on the rotating shaft by a suitable retaining sleeve 27. The retaining sleeve 27 has internal threads to engage threads 28 on the shaft 10 and cooperates with a bushing 29 to confine a suitable O-ring 30 to prevent flow of the high-pressure fluid along the shaft. The annular sealing member 18 is backed against a packing ring 31 inside the retaining sleeve 27 and is embraced by an O-ring 32 to prevent leakage of the high-pressure fluid past its outer circumferential surface.

While differential fluid pressure normally urges the follower 16 toward the second annular sealing member 18 on the shaft for the required close positioning of the two sealing faces 17 and 19, such differential pressure is not effective when a substantial gap occurs between the two sealing faces 17 and 19 and, of course, the apparatus is occasionally in a state of no fluid pressure whatsoever. Therefore, supplementary means in the form of the usual coil spring 35 is provided to urge the follower 16 toward the annular sealing member 18 on the shaft. The coil spring 35 is in compression between a circumferential flange 36 of the follower 16 and the end wall 37 of the sealing chamber 12. Preferably the coil spring serves the further function of preventing any substantial rotation of the follower. For this purpose, each end of the coil spring may be bent to form a toe or lug 38, one of the lugs seating in a recess 39 in the follower flange 36 and the other seating in a recess 40 in the end wall 37.

With reference again to Fig. 1, the axial outward movement of the shaft 10 in response to the high fluid pressure may be restrained by any suitable means. In the construction which is shown in a simplified manner in Fig. 1, the restraining means includes an open housing generally designated 43 surrounding the sealing chamber 12 which housing carries on its top wall 44 a suitable bearing case generally designated 45. In the construction shown, a thrust bearing generally designated 46 is mounted in the bearing case 45 between two suitable retaining rings 47. The thrust bearing comprises two roller bearings 48 and 49 that engage opposite sides of a circumferential flange 50 of a thrust collar 51 carried by the shaft 10.

It may be readily understood from an inspection of Fig. 1 that an outward thrust developed by high pressure on the shaft 10 will cause a certain degree of yielding action in various parts of the described shaft restraining structure, which yielding actions will be cumulative to result in a minute but significant bodily shift of the shaft 10 axially outward from the high-pressure zone. Thus, the yield in tension of the circumferential wall 55 of the bearing case 45, the responsive upward flexure of the top wall 44 of the housing 43 and the responsive yield in tension of the circumferential wall 56 of the housing will each contribute to the upward movement of the thrust bearing 46 whenever the device is initially placed under the normal high fluid pressure. It is also apparent that the shaft 10 itself will yield in compression. Thus, the second sealing member 18 carried by the shaft 10 will shift axially upward as the shaft follows the upward yielding movement of the thrust bearing 46 and will move upward additionally as the shaft contracts in compression longitudinally under the applied pressure.

Referring to Fig. 2 it is apparent that if the sleeve 15 is substantially immovable under all conditions the responsive upward movement of the shaft in the region of the retaining sleeve 27 will carry the second annular sealing member 18 upward and cause the abutting follower 16 to slide the O-ring 24 upward along the outer polished surface of the sleeve. With a fluid pressure of relatively great magnitude, as in this instance, this upward force applied against the follower 16 by the second annular sealing member 18 will be sufficient to break any bond the O-ring 24 may make with the polished surface of the sleeve 15.

The difficulty, however, is that over a period of a few hours of operation at the normal high fluid pressure, the O-ring 24, being substantailly stationary or moving only infrequently during this period, will have opportunity to develop a tenacious bond with the sleeve 15. The resistance of such a bond will prevent the follower 16 from shifting downward to follow the retreating annular sealing member 18 when the fluid pressure is substantially lowered or dropped to zero. As heretofore stated, this difficulty is met by constructing a wall of the sealing chamber 12 in a fluid-responsive manner to cause the sleeve 15 to shift in substantially the same manner as the annular sealing member 18 on the shaft, thereby to substantially eliminate relative movement between the sleeve and the follower 16. With such relative movement reduced to a minimum that can be accommodated by resilient deformation of the O-ring 24 the tenacious adherence of the O-ring to the surface of the sleeve 15 becomes innocuous and no longer a cause for the development of a leakage gap between the two sealing faces 17 and 19.

While the desired compensating yielding action in response to fluid pressure on the part of a wall of the sealing chamber 12 may be provided in various ways in the construction of the sealing chamber, we prefer in the initial embodiment of the invention to provide a fluid-responsive yielding action in the end wall 37 of the sealing chamber. For this purpose the end wall 37 is in the form of a suitable heavy metal ring, which will hereinafter be termed a diaphragm ring. This diaphragm ring 37, which has sufficient freedom for flexure for its purpose, has its outer circumferential edge portion anchored to the circumferential wall 57 of the sealing chamber and its inner circumferential edge portion operatively connected to the sleeve 15 for control thereof.

In the particular construction shown in Fig. 2 the circumferential wall 57 of the sealing chamber 12 has an annular recess 60 adjacent its upper end in which a thin polished facing ring 61 is mounted for cooperation with an O-ring 62. The O-ring 62 which lies against an anti-extrusion ring 63 is mounted in an outer circumferential recess of the diaphragm ring 37. In like manner an O-ring 65 and associated anti-extrusion ring 66 are mounted in an inner circumferential recess or groove 67 of the diaphragm ring for sealing contact with the polished surface of the sleeve 15.

The diaphragm ring 37 may be releasably retained in its assembled position by a suitable retaining ring 70 that is anchored to the outer end of the circumferential wall 57 of the sealing chamber by suitable screws 71. Thus the retaining ring 70 provides an annular shoulder 72 for abutment by the outer circumferential edge portion of the diaphragm ring 37 to serve as a stop to limit outward movement of the diaphragm member.

The inner circumferential edge portion of the diaphragm ring 37 may be operatively connected with the sleeve 15 in any suitable manner. For example, as shown in the drawing, the sleeve 15 may be formed with an outer circumferential shoulder 73 for abutment against the inner circumferential edge portion of the diaphragm ring 37 and the upper end of the sleeve may be threaded as shown to receive a bushing 74 to engage the inner circumferential edge portion of the diaphragm ring from above. The bushing 74 should be screwed down tight enough to retain the diaphragm ring 37 in contact with the sleeve shoulder 73 but should not be so tight as to interfere with the desired freedom for flexure of the diaphragm ring.

The manner in which the invention functions to serve its purpose may be readily understood from the foregoing description. It will be apparent that the yield in flexure of the diaphragm ring 37 in response to high fluid pressure inside the sealing chamber 12 will cause the sleeve 15 to shift upward with increasing fluid pressure at the time the sealing member 18 on the shaft and the follower 16 shift upward in response to rising pressure. By properly designing the diaphragm ring 37 for yield in response it fluid pressure and making sure that the elastic limit of the diaphragm ring is sufficient to include the desired range of flexure, the fluid-pressure-responsive shift of the sleeve 15 may be made to correspond closely to the fluid pressure responsiveness of the follower 16. Thus, relative axial movement between the sleeve and follower may be reduced to a relatively small magnitude that can be accommodated by resilient deformation of the O-ring 24 without actual sliding movement of the O-ring along the surface of the sleeve 15.

Apparently conventional stress formulas do not apply to the diaphragm ring 37 at such exceedingly high pressure but it is a relatively simple matter to develop the required design for the diaphragm ring empirically. It is a simple matter to use a dial indicator to ascertain the approximate longitudinal distance the shaft 10 moves in response to pressure changes. It is also possible to set up an arrangement with a depth micrometer in conjunction with a diaphragm to measure the movement of the follower 16 in response to pressure changes. Thus it is merely necessary to vary the dimensions, material or other aspects of the diaphragm ring 37 to arrive at a design for the diaphragm ring that will make the pressure responses of the sleeve 15 substantially equal to the pressure responses of the annular sealing member 18 on the shaft.

A feature of this particular form of the invention is the dual function of the spring 35. In addition to its normal function of urging the follower 16 toward the sealing member 18 on the shaft, the spring 35 exerts continuous pressure upward against the diaphragm ring 37. In the absence of fluid pressure in the sealing chamber the spring holds the diaphragm ring 37 against the stop shoulder 72.

Figure 3:
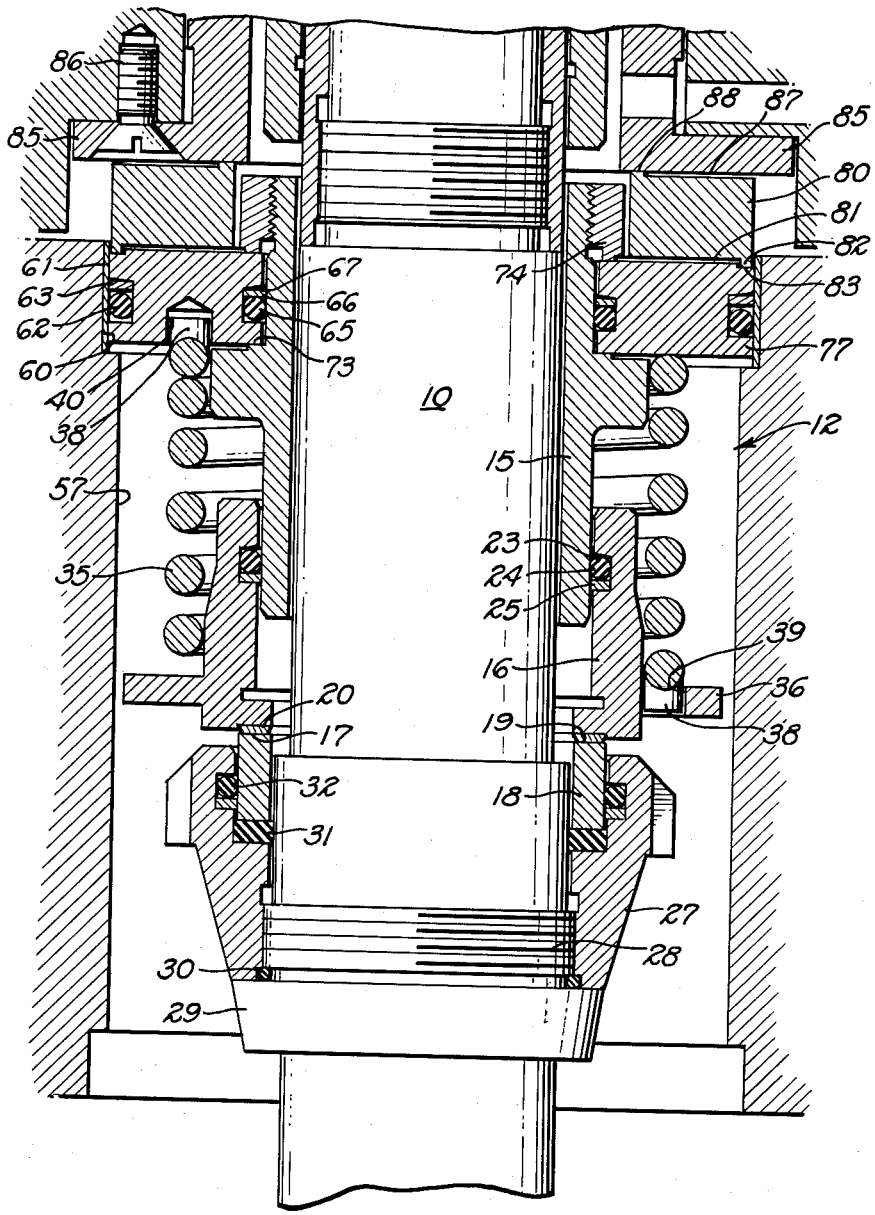
Fig. 3 is a view similar to Fig. 2 showing a second form of the invention.

The second embodiment of the invention illustrated in Fig. 3 is identical in many of its parts with the construction previously described, as indicated by the use of corresponding numerals to indicate corresponding parts. This form of the invention is characterized by the concept of using a plurality or stack of rings for additive yielding action so that a relatively large total responsive movement may be generated within a space of approximately the same radial dimension as the previously described diaphragm ring 37 of Fig. 2.

In Fig. 3 what may be termed an inner diaphragm ring 77 is substituted for the previously described diaphragm ring 37 and is anchored to the sleeve 15 in the same manner as heretofore described.

The outer peripheral edge portion of the inner diaphragm ring 77 is in operating contact or abutment with the corresponding outer circumferential edge portion of a second outer diaphragm ring 80 which lies at least approximately in the same radial zone as the inner diaphragm ring with respect to radial distance from the axis of the shaft 10. To provide freedom for flexure of the two diaphragm rings without mutual interference one of the two may be cut away to provide a clearance space 81. In this instance the outer diaphragm ring 80 is cut away to provide the space 81 and thus form what may be termed a rim or flange 82 for operating contact with the inner diaphragm ring 77. In the construction shown the inner diaphragm ring 77 has a relatively shallow annular recess 83 to seat the flange 82, the flange and recess functioning as a fulcrum connection between the two diaphragm rings.

The outer diaphragm ring 80 in turn is suitably adapted at its inner circumferential edge portion for operative contact or abutment with a fixed retaining member 85 that is held in place by screws 86. As heretofore explained, such fixed retaining member serves as a stop shoulder carried by the circumferential wall. Here again freedom for flexure on the part of the outer diaphragm ring 80 is provided by a clearance space as indicated at 87. In the construction shown the clearance space 87 is formed by cutting away the upper surface of the outer diaphragm ring 80 thereby forming an annular rim or flange 88 at the inner circumferential edge portion of the diaphragm ring for rocking contact with the fixed retaining member 85.

It is apparent that flexure of the inner diaphragm ring 77 in response to fluid pressure causes the outer edge portion of the diaphragm ring to move against the corresponding outer circumferential edge portion of the outer diaphragm ring 80. The outer diaphragm ring 80 is not subject to fluid pressure but nevertheless receives a portion of the fluid pressure load in this manner and in its turn flexes in accord with the transmitted load. Thus, as viewed in cross-section in Fig. 3, the outer diaphragm ring 80 rocks about the point of contact with the fixed retaining member 85 at the fulcrum flange 88, and the inner diaphragm ring 77 not only rocks about the fulcrum flange 82 but also shifts bodily in accord with the flexure of the outer diaphragm ring. In this way the two diaphragm rings share the fluid pressure load and their yielding actions are added together to produce the resultant shifting of the sleeve 15. The arrangement makes it possible to provide yielding action of relatively large magnitude by yielding means dimensioned to function in a restricted radial zone and simplifies the problem of designing the diaphragm rings for yielding action within their elastic limits. Obviously as many rings may be stacked in such arrangement as may be desired.

Our description in specific detail of the two presently preferred embodiments of the invention will suggest to those skilled in the art various ways in which the same basic concept may be embodied for various purposes within the scope and spirit of the appended claims.

We claim as our invention:

1. A sealing means for preventing leakage from a zone containing fluid under high pressure along a rotary shaft having an inner portion which is disposed in said zone and an outer portion which is external to said zone, said inner portion of said shaft being restrained against outward axial movement by restraining means engaging said outer portion thereof, but said inner portion of said shaft nevertheless moving axially outward to some extent due to yielding of said restraining means and axial compression of said shaft produced by said high pressure, said sealing means including: a nonrotatable sleeve surrounding said shaft; a first, nonrotatable annular sealing member in telescoped relation with said sleeve, said first sealing member having a first sealing face; an annular seal between said sleeve and said first sealing member; a second annular sealing member mounted on said shaft for rotation therewith, said second sealing member having a second sealing face engaging said first sealing face; and yieldable supporting means for said sleeve exposed to said high pressure and having a yieldability due to said high pressure which is substantially equal to said outward movement of said inner portion of said shaft which is produced by said high pressure so as to minimize relative axial movement between said sleeve and said first sealing member.

2. A sealing means for preventing leakage from a zone containing fluid under high pressure along a rotary shaft having an inner portion which is disposed in said zone, and an outer portion which is external to said zone, said inner portion of said shaft being restrained against outward axial movement by restraining means engaging said outer portion thereof, but said inner portion of said shaft nevertheless moving axially outward to some extent due to yielding of said restraining means and axial compression of said shaft produced by said high pressure, said sealing means including: a nonrotatable sleeve in said zone surrounding said inner portion of said shaft; a first, nonrotatable annular sealing member in telescoped relation with said sleeve, said first sealing member having a first sealing face; an annular seal between said sleeve and said first sealing member; a second annular sealing member mounted on said inner portion of said shaft for rotation with said shaft, said second sealing member having a second sealing face engaging said first sealing face; and yieldable supporting means for said sleeve forming an end wall of said zone and exposed to said high pressure and having a yieldability due to said high pressure which is substantially equal to said outward movement of said inner portion of said shaft which is produced by said high pressure so as to minimize relative axial movement between said sleeve and said first sealing member.

3. A sealing means as defined in claim 2 including spring means engaging said first sealing member for biasing said first sealing face into engagement with said second sealing face.

4. A sealing means as defined in claim 3 wherein said spring means includes a compression spring seated at one end against said first sealing member and at its other end against said yieldable supporting means.

5. A sealing means as defined in claim 2 wherein said zone is encircled by a circumferential wall encompassing said inner portion of said shaft, said sleeve and said sealing members, said yieldable supporting means including a ring the outer periphery of which engages said circumferential wall and the inner periphery of which engages said sleeve.

6. A sealing means as set forth in claim 5 wherein said circumferential wall is provided with an annular shoulder facing axially inward with respect to said zone and on which said outer periphery of said ring is sealed, said sealing means including spring means biasing said ring into engagement with said annular shoulder.

7. A sealing means as defined in claim 6 wherein said spring means includes a compression spring seated at one end against said ring and at its other end against said first sealing member to bias said first sealing face into engagement with said second sealing face.

8. A sealing device as defined in claim 2 wherein said yieldable supporting means includes a stack of at least two rings, the inner periphery of one of said rings engaging said sleeve and the outer periphery of said one ring engaging the outer periphery of the next ring in said stack, said sealing means including restraining means engaging the inner periphery of said next ring.

References Cited in the file of this patent

UNITED STATES PATENTS

| | | |
|---|---|---|
| 1,789,978 | Hull | Jan. 27, 1931 |
| 2,010,930 | Rowe | Aug. 13, 1935 |
| 2,259,422 | Karlberg | Oct. 14, 1941 |
| 2,370,964 | Janette | Mar. 6, 1945 |
| 2,438,457 | Schlosser | Mar. 23, 1948 |
| 2,587,222 | Riester | Feb. 26, 1952 |

FOREIGN PATENTS

| | | |
|---|---|---|
| 427,370 | Italy | Nov. 18, 1947 |